United States Patent
Yoshimoto et al.

(10) Patent No.: US 9,185,336 B2
(45) Date of Patent: Nov. 10, 2015

(54) DISC PLAYER DEVICE

(75) Inventors: Takashi Yoshimoto, Kanagawa (JP);
Yoshinori Hiramatsu, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/377,596

(22) PCT Filed: Jan. 28, 2011

(86) PCT No.: PCT/JP2011/000461
§ 371 (c)(1),
(2), (4) Date: Dec. 12, 2011

(87) PCT Pub. No.: WO2011/093087
PCT Pub. Date: Aug. 4, 2011

(65) Prior Publication Data
US 2012/0134647 A1    May 31, 2012

(30) Foreign Application Priority Data

Jan. 28, 2010  (JP) ................................ 2010-016465

(51) Int. Cl.
*H04N 5/84* (2006.01)
*H04N 5/89* (2006.01)
*H04N 5/783* (2006.01)
(Continued)

(52) U.S. Cl.
CPC .............. *H04N 5/783* (2013.01); *G11B 27/005* (2013.01); *G11B 27/105* (2013.01); *G11B 2220/2541* (2013.01); *H04N 5/85* (2013.01)

(58) Field of Classification Search
USPC ................................................ 386/335–336
See application file for complete search history.

(56) References Cited

U.S. PATENT DOCUMENTS 8,566,873 B2 *  10/2013  Sie et al. ......................... 725/41
2003/0236582 A1  12/2003  Zamir et al.
(Continued)

FOREIGN PATENT DOCUMENTS

JP    2002-369124 A    12/2002
JP    2005-071419 A     3/2005
(Continued)

OTHER PUBLICATIONS

International Search Report for Application No. PCT/JP2011/000461, Apr. 26, 2011, Panasonic Corporation.
(Continued)

*Primary Examiner* — Nigar Chowdhury
(74) *Attorney, Agent, or Firm* — RatnerPrestia (57) ABSTRACT

According to the present invention, provided is a disc player device (100) that automatically performs a user operation for playing a first play that is a title played before playing of a main part or display of a menu, faster than playing at a normal speed after the power is applied. A signal processing unit (15) is provided with a menu detection unit (17) to analyze structure of various data and detect a menu state, a main part detection unit (18) to detect playing state of a main part from the various data, and a user operation unit (19) to automatically perform a user operation for playing a title currently being played faster than playing at a normal speed until a menu state is detected by the menu detection unit (17) or a playing state of a main part is detected by the main part detection unit (18) when the signal processing unit (15) determines that a First Playback exists after the power is applied.

6 Claims, 6 Drawing Sheets

(51) Int. Cl.
　　*G11B 27/00* (2006.01)
　　*G11B 27/10* (2006.01)
　　*H04N 5/85* (2006.01)

(56) References Cited

U.S. PATENT DOCUMENTS

| | | |
|---|---|---|
| 2006/0140091 A1 | 6/2006 | Iwamoto et al. |
| 2007/0031114 A1* | 2/2007 | Ryu ............................ 386/95 |
| 2008/0292270 A1 | 11/2008 | Ikeda |
| 2010/0008653 A1 | 1/2010 | Iwasaki et al. |

FOREIGN PATENT DOCUMENTS

| | | |
|---|---|---|
| JP | 2005-267755 A | 9/2005 |
| JP | 2008-287820 A | 11/2008 |
| JP | 2009-118387 A | 5/2009 |
| JP | 2009-176411 A | 8/2009 |
| WO | WO 2006/082892 A1 | 8/2006 |

OTHER PUBLICATIONS

International Preliminary Report on Patentability for PCT/JP2011/000461, with Written Opinion, Sep. 18, 2012.
Supplementary European Search Report for EP 11736802.7, Jul. 8, 2014.

* cited by examiner

DISC PLAYER DEVICE

This application is a U.S. National Phase Application of PCT International Application PCT/JP2011/000461.

TECHNICAL FIELD

The present invention relates to a disc player device (reproduction device) that plays (reproduces) data recorded in a recording medium such as a Blu-ray Disc Read Only Memory (BD-ROM).

BACKGROUND ART

In recent years, an optical disc player device has become widespread in household-use for an optical disc that has an advanced interactive function with high-definition images and high quality sounds and has a large amount of information recorded thereon.

A typical high capacity optical disc is a Blu-ray Disc (hereinafter referred to as "BD"). A BD is provided with a huge data capacity: 25 gigabytes (GB) in a single layer and 50 GB in a dual layer, and can store high definition movie content. Commercially available or rental-use packaged software using the BD is supplied as a BD-ROM that is a read-only media in which data is written in the course of manufacture and which is not recordable and not rewritable.

For the BD-ROM, two modes of specifications have been developed: High Definition Movie (HDMV) mode and Blu-Ray Disc Java (BD-J) mode. In the HDMV mode, codec specification for video and sound is extended from a conventional Digital Versatile Disc Read Only Memory (DVD-ROM), and high definition video and high quality audio are available. It is noted that content specification of a BD-ROM is similar to that of a DVD-ROM. In the BD-J mode, in addition to the HDMV mode, visual representation such as a superimposed video can be added by a Java® application.

An operation in which a disc player device plays a BD-ROM will now be described.

A BD-ROM such as packaged software is managed on a basis of a plurality of reproducible titles. Some titles are played before playing of a main part or display of a menu (hereinafter, the title is referred to as a "first play") among the plurality of titles when the power is turned on. A first play is an introduction of other packaged software, a movie preview, demonstration content for sound field playing technology, or the like. Some packaged software takes as long as five minutes in a first play when the first play is played at a normal speed.

In addition, in each title including a first play, a user operation can be restricted by a user operation mask (hereinafter referred to as "UO mask"). UO mask refers to a restriction on user operations such as a button operation of a menu screen, menu shift, title skip, stop playing, chapter selection, fast forward, and reverse play that are used when a user watches and listens to packaged software.

When UO mask is set, any user operation is restricted by a software module that serves to accept a user operation. With the function, an operation intended by a content provider can be realized.

Accordingly, in a household-use BD player device, when it is desired that video of a main part are played as soon as possible after a disc is inserted, a user operation such as menu shift, title skip, and fast forward can be performed by operating a remote control and a time of a first play can be reduced if UO mask is not set to the first play.

In addition, it has been proposed to play a digital stream recorded in a recording medium such as an optical disc by an operation without a Graphical User Interface (GUI) similar to an operation of a Compact Disc (CD) player device when a BD-ROM player device is used in a car (for example, see Patent Literature 1).

However, in many cases where a disc player device is used in a car, a driver is barred from operating the disc player device during the movement of the vehicle, and a playing time of a first play cannot be reduced by operating a remote control.

Especially, in a BD-J title, continued playing (resume playing) is not practical when the playing is resumed after the car engine is turned off or an instantaneous power interruption occurs because a lot of memory is needed. Therefore, generally, when these events occur, the playing is started again from a first play. For example, when the car engine is turned off to take a rest during car travel and the power is turned on again after taking the rest, a first play of the same content is played for a few minutes every time and then video of a main part is played.

CITATION LIST

Patent Literature

[Patent Literature 1] Japanese Patent Application Laid-Open No. 2009-176411

SUMMARY OF INVENTION

Technical Problem

The present invention has been conceived under the above-described background. An object of the invention is to provide an optical disc player device in which a time for performing transition to display of a menu or playing of a main part can be reduced in an environment where the power is often turned on and off by abbreviating and playing a first play automatically.

Solution to Problem

According to one aspect of the present invention, a disc player device that plays a disc managed on a basis of a plurality of titles including a menu and a main part, etc. at least, the disc player device including: a signal processing unit that obtains various data held in the disc and performs signal processing of the various data; a menu detection unit that analyzes the structure of the various data and detects a menu state; a main part detection unit for detecting a playing state of a main part from the various data; and a user operation unit for automatically performing a user operation for playing a title currently being played faster than playing at a normal speed until the menu state is detected by the menu detection unit or the playing state of the main part is detected by the main part detection unit when the signal processing unit determines that a First Playback exists after the power is applied.

According to the invention, it is possible to provide a disc player device that automatically reduces a playing time of a first play and can reduce a time for performing transition to display of menu or playing of a main part. Especially, the disc player device is effective for a case where a BD-J title for which it is practically difficult to perform a function of continued playing (resume playing) is played in a vehicle environment where the power is often turned on and off.

DESCRIPTION OF EMBODIMENTS

The present invention will be described below in detail. However, the detailed description provided below and accompanying drawings are not intended to limit the invention.

A disc player device 100 according to an embodiment will now be described with reference to FIG. 1 that is a block diagram. The disc player device is provided with various functions as described below. These functions may be realized by a program stored in a memory, etc. of the disc player device.

The disc player device 100 includes a pickup 11 that obtains data from a BD-ROM 10, a servo 12 that controls the pickup 11, a local storage 13, a network interface 14, a signal processing unit 15, a playing unit 16. In addition, the signal processing unit 15 includes a menu detection unit 17, a main part detection unit 18, and a user operation unit 19.

Figure 1:
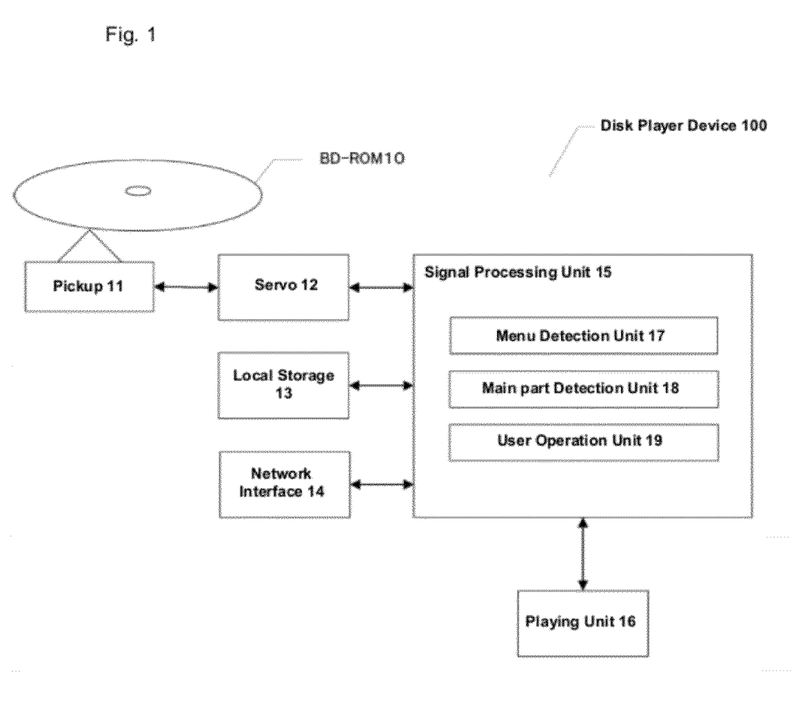
FIG. 1 illustrates a block diagram of a disc player device 100 according to an embodiment.

The BD-ROM 10 illustrated in FIG. 1 is a recording medium in which an audio video (AV) content such as a movie work and a live video is recorded.

The servo 12 is a device that moves the pickup 11 in the radial direction of the recording medium (seek) and moves the pickup 11 in the axial direction of the recording medium (focus). In addition, the pickup 11 obtains desired data from the BD-ROM 10 and transmits the data to the signal processing unit 15.

Data processed by the signal processing unit 15 includes, not only data from the BD-ROM 10 but also data stored in the local storage 13 and data downloaded from a network through the network interface 14. The signal processing unit 15 is means that processes the data and allows the playing unit 16 to play AV content, etc.

The playing unit 16 includes a function to convert the data processed by the signal processing unit 15 into reproducible data by a TV monitor 43 described later.

The menu detection unit 17 is included in the signal processing unit 15 and includes a function to detect whether or not a menu screen is displayed. A plurality of buttons is displayed in the menu screen, and when a user selects each of the buttons and enters the button selection, a user operation is performed based on the selected button, thereby proceeding to a next state. Here, a "user operation" corresponds to an operation such as a button operation of a menu screen, menu shift, title skip, stop, chapter selection, fast forward, and reverse play in a case where a user watches and listens to packaged software. The menu detection unit 17 will be described in detail later.

The signal processing unit 15 receives information of a user operation, determines whether or not the operation can be accepted, and causes the user operation unit 19 to perform the operation when the operation can be accepted. In addition, generally, when playing of a menu screen is set to be performed immediately after a disc is inserted, in many cases, a button for playing a main part of a movie, etc. is preliminarily selected at the time when the menu screen is played. In this case, when a user operation of the button selected at the time when the menu screen is played is performed and the menu screen proceeds to a next state, the main part is played.

The main part detection unit 18 includes a function to detect a playing state of a main part. The main part detection unit 18 will be described in detail later.

A file configuration of the BD-ROM 10 will now be described with reference to FIG. 2.

Figure 2:
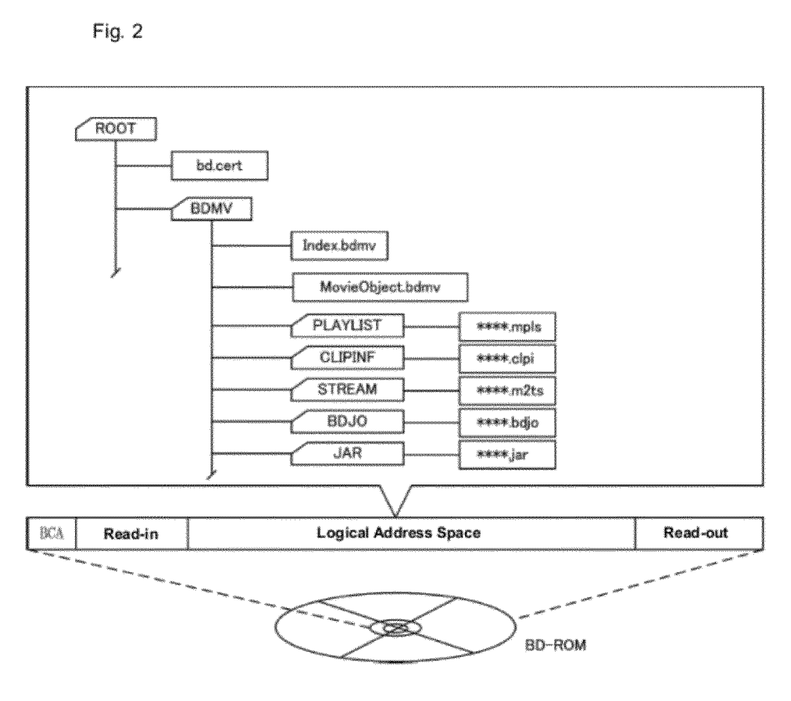
FIG. 2 illustrates a diagram illustrating a configuration of a BD-ROM according to the embodiment.

FIG. 2 is a diagram illustrating a configuration of the BD-ROM 10. The BD-ROM 10 has a recording area in a spiral form from the inner radius toward the outer radius as similar to, for example, a Digital Versatile Disc (DVD), a CD and the like, and has a logical address space in which logical data can be recorded between a read-in of the inner radius and a read-out of the outer radius. In addition, there is a special area called a Burst Cutting Area (BCA) inside the read-in which is read only by a drive. Such area cannot be read from an application, so that the area is used, for example, for a copyright protection technology and the like.

In the logical address space, application data such as video data led by file system information (volume) is recorded. A file system corresponds to a Universal Disk Format (UDF), ISO9660 and the like and allows reading logical data recorded as in a normal personal computer (PC) using a directory and a file structure, and 255 characters of a file name or a directory name can be read.

In the embodiment, as a directory and file structure on a disc of the BD-ROM 10, a BDMV directory and a bd.cert file are placed immediately under a root directory (ROOT). The BDMV directory is a directory in which data such as AV content and management information that are dealt in the BD-ROM 10 is recorded. The bd.cert (file name fixed) is a certification used for signature verification when content added for virtual packaged software are merged with data on the BD-ROM 10.

Under the BDMV directory, there exists five subdirectories referred to as a PLAYLIST directory, a CLIPINF directory, a STREAM directory, a BDJO directory, a JAR directory, and in the BDMV directory, two types of file including an index.bdmv and a MovieObject.bdmv are placed.

The index.bdmv (file name fixed) will now be described in further detail. The index.bdmv is management information about the whole of the BD-ROM 10 and includes information such as an organization ID (32 bit) that is an identifier to identify a provider of a movie work and a disc ID (128 bit) that is an identifier assigned to each of the BD-ROMs 10 provided by the provider, and, in the disc player device 100, a disc is identified uniquely by reading the index.bdmv first after the disc is inserted into the disc player device 100. In addition, the index.bdmv includes a table indicating association of each of a plurality of reproducible titles in the BD-ROM 10 and a BD-J object defining each of the titles.

Figure 3:
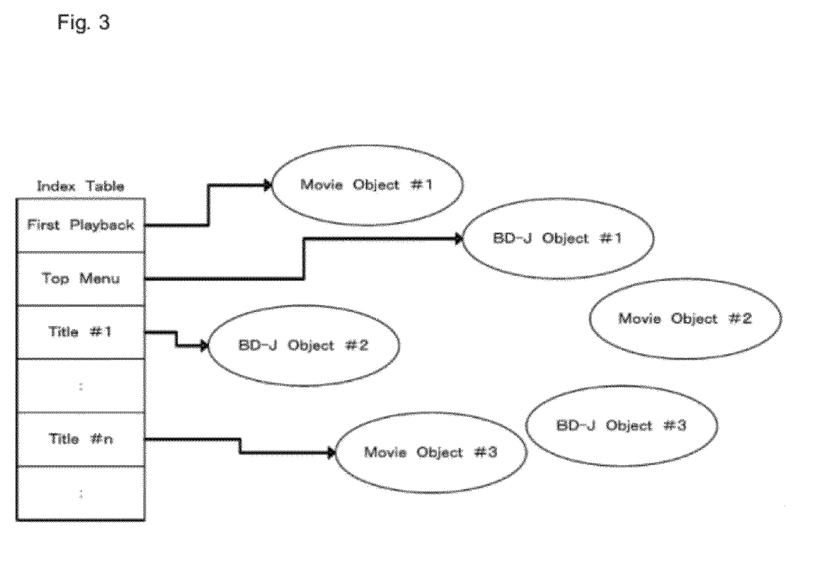
FIG. 3 illustrates a diagram illustrating relation of an index.bdmv file and a title according to the embodiment.

FIG. 3 is a diagram illustrating relation of an index.bdmv file and a title. A title corresponds to a playing unit that pairs up an application with an AV stream and a title configuration on a disc is written in the index.bdmv file, and the index.bdmv file manages reference relation of each of the titles on the disc and the corresponding application (a Java (R) application in the BD-J mode title or a scenario program in the HDMV mode title). In addition, there exists a "First Playback" and "Top Menu" as particular titles. The "First Playback" corresponds to a title that is automatically played first when a BD starts. It is noted that the first play described above corresponds to a title that includes the First Playback and that is played before playing of a main part or display of a menu. It is noted that a location of a title that is played as a first play may be described in the First Playback. Mainly, the First Playback is used for a display for terms, conditions, etc. of a BD. The "Top Menu" is played when a menu key of a remote control is pressed or a title playing is completed, and mainly used to perform title selection or language selection for subtitles and sounds.

Figure 4:
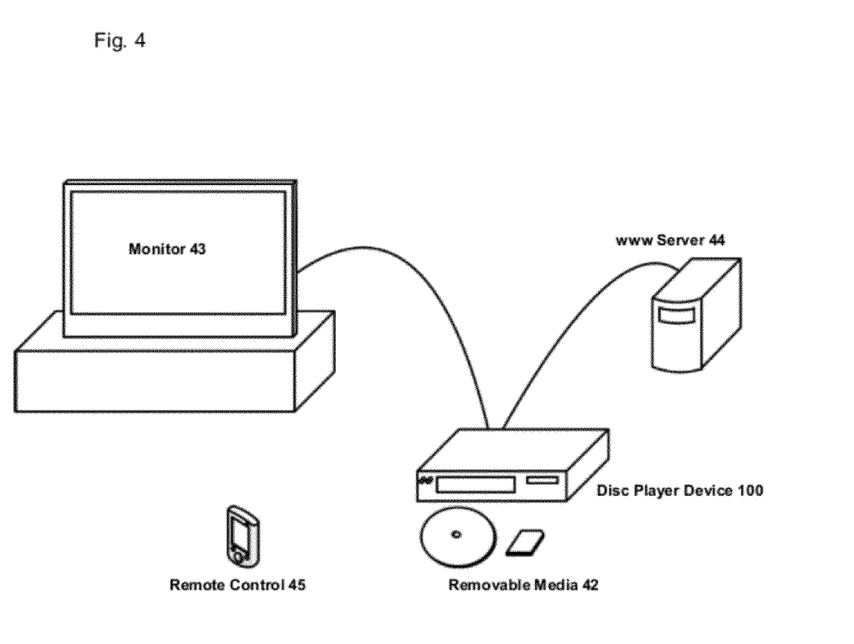
FIG. 4 illustrates a diagram illustrating a system configuration using the disc player device 100 according to the embodiment.

An example of a usage pattern of the disc player device 100 according to the embodiment in a system is shown in FIG. 4 and will now be described. For example, the disc player device 100 is composed of the BD-ROM 10, a removable media 42, the monitor 43, a WWW server 44, and a remote control 45.

The monitor 43 is a device to display video and also includes a function to display an operation menu to a user. Thus, the user can operate the disc player device 100 visually.

The remote control 45 is a device to remotely perform a user operation to the disc player device 100. A user can play content recorded in the BD-ROM 10 when the user operates the remote control 45 or a button on the disc player device 100.

The WWW server 44 is a location storing data that is downloaded through the network interface 14 from a network by the disc player device 100.

The removable media 42 is used when the BD-J title is played and stores various data.

Such system configuration can also be installed into a vehicle, and in this case, there exists a configuration in which the disc player device 100 and the monitor 43 are integrated.

A transition from loading to a menu and a main part will now be described with reference to the flow diagram of FIG. 5.

When the disc player device 100 performs loading to the BD-ROM 10 (Step 50), the disc player device 100 obtains disc management information first (Step 51). Next, the signal processing unit 15 reads index.bdmv and confirms whether or not the First Playback exists (Step 52). When a First Playback exists, the playing unit 16 is instructed to play a first play based on the instruction of the First Playback. After that, the signal processing unit 15 temporarily stores UO mask information of a location currently being played of the disc management information obtained in Step 51, in a memory (not illustrated) such as a Random Access Memory (RAM). In addition, when the First Playback does not exist, a normal play is performed. It is noted that it is probable that there may be a title in which the process does not proceed to a playing operation without a user operation when the First Playback does not exist, however in this case, the process may be adapted to proceed to a normal play after waiting for a user operation.

It is noted that a user operation can be restricted by the UO mask in a first play. In a case where the UO mask is set, the signal processing unit 15 that is to accept a user operation ignores the user operation, so that the user operation is restricted even when the user operation is performed. Due to the function, operations intended by a content provider can be realized.

Next, procedures are described in which the process automatically proceeds to a menu or a main part faster when a user operation is not restricted by the UO mask in a first play. It is noted that UO mask information of user operations described next such as Menu Call, Chapter Search, Skip to Next Point, Time Search, and Forward Play is stored in a Playlist directory illustrated in FIG. 2 for each Playlist. It is noted it is probable that UO mask information is described in management information of other directories. Each of the user operations will now be described.

The "Menu Call" is a user operation in which transition to a top menu title defined in an index table is performed. If a corresponding title does not exist, the user operation is ignored.

The "Chapter Search" starts playing from a position specified by chapter_number in a movie title currently being played. When specified chapter_number does not exist in a movie title, the user operation is ignored.

The "Time Search" starts playing from a position specified by an elapsed time in a movie title currently being played. When a specified elapsed time does not exist in a movie title, the user operation is ignored.

The "Skip to Next point" is an operation in which transition to a position of next Entry_mark in a title currently being played is performed. Many of Entry_mark are used to mark off chapters. When a position of Entry_mark does not exist in a playing title in the direction of time passage, the user operation is ignored.

The "Forward Play" is an operation to play at a specified speed in the direction of time passage. When the disc player device 100 does not support a specified playing speed, playing at a playing speed that most closely matches a playing speed supported by the disc player device 100 is performed.

Figure 5:
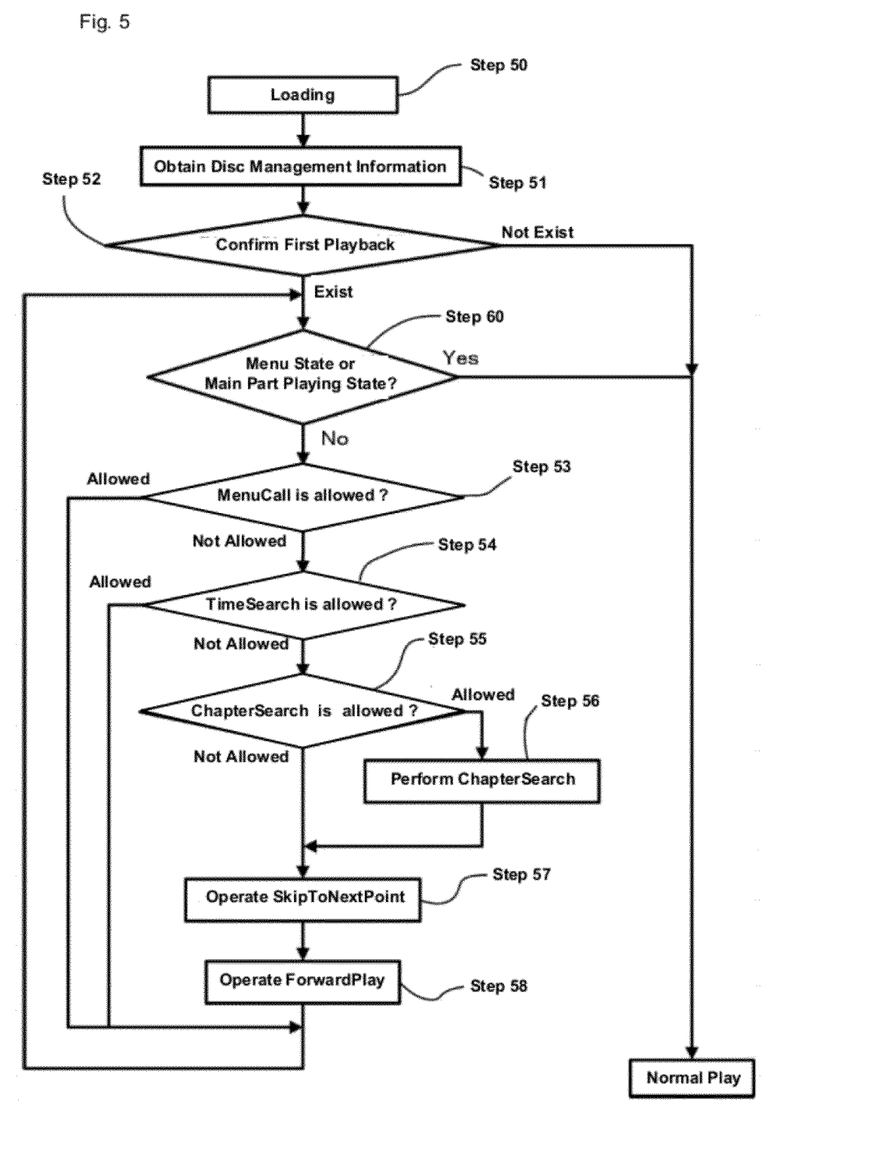
FIG. 5 illustrates a flow diagram for illustrating operation of the disc player device 100 according to the embodiment.

Referring back to the flow diagram of FIG. 5, description of the procedure is carried on. After the obtaining of the disc management information in Step 51, the signal processing unit 15 confirms whether or not a First Playback exists (Step 52). The process proceeds to a normal play when a First Playback does not exist, and the process proceeds to Step 60 when a First Playback exists.

In Step 60, the menu detection unit detects whether or not being in a menu state, and the main part detection unit 18 detects whether or not transition to a main part is performed. When a menu state or playing of a main part is detected, the process proceeds to normal play because a first play does not exist or a playing time is completed. When a menu state or playing of a main part is not detected, the process proceeds to processing of Step 53 and steps after Step 53 in which a playing time of a first play is reduced. It is noted that when the menu detection unit detects a menu state, that is, in a case of being in a menu state, in many cases, a button for playing a main part of a movie, etc. is preliminarily selected. Thus, when a user operation of a button selected at the time when a menu screen is played is performed, a main part is played. A processing procedure of the menu detection unit and a processing procedure of the main part detection unit are described in detail later.

In Step 53, the signal processing unit 15 confirms UO mask of the Menu Call. When the Menu Call is allowed (the user operation is not restricted by UO mask), the Menu Call is performed and the process returns to Step 60. When the Menu Call is not allowed (the user operation is restricted by UO mask), the process proceeds to Step 54.

In Step 54, when the time Search is allowed, the Time Search to a final time of a final chapter in a title is performed, and the process returns to Step 60. When the Time Search is not allowed, the process proceeds to Step 55.

In Step 55, when the Chapter Search is allowed, the process proceeds to Step 56, and when the Chapter Search is not allowed or there is one chapter to be played in a title, for example, transition to a final chapter in a title is performed, the process proceeds to Step 57.

In Step 56, it is confirmed whether or not a plurality of chapters exists and the Chapter Search is performed when a plurality of chapters exists, and the process proceeds to Step 57 after transition to a final chapter in the title is performed. It is noted that, in Step 56, it may be determined whether the number of chapters to be played in the title is one or not.

In Step 57, when the Skip to Next Point is allowed, the process proceeds to Step 58 after the Skip to Next Point is performed until transition to a final point in the title is performed. When the Skip to Next Point is not allowed, the process proceeds to Step 58.

In Step 58, when the Forward Play is allowed, a user operation of the Forward Play is performed, and fast forward to a final time of the chapter at a maximum feasible speed is performed. When the Forward Play is not allowed, the process returns to Step 60.

An operation in which the menu detection unit 17 detects transition to a menu screen will now be described in detail with reference to FIG. 6.

A BD-ROM is broadly classified into a HDMV mode title and a BD-J mode title as described above. In addition, a top menu of the BD-ROM 10 is specified by a standard so that zero is allocated as a title number.

In the HDMV mode title, a title number for each title is written in an index table. Thus, the menu detection unit 17 detects that a screen is in a menu state by confirming a title number currently being played is zero.

However, in the BD-J mode title, a title number for each title is not described in an index table. Alternatively, a file name to be played is written. Thus, the menu detection unit 17 cannot detect a screen is in a menu state because the menu detection unit 17 cannot detect a title number currently being played. Here, in the embodiment, it is determined that a screen is in a menu state by analyzing structure of Movie Playlist illustrated in FIG. 6.

Figure 6:
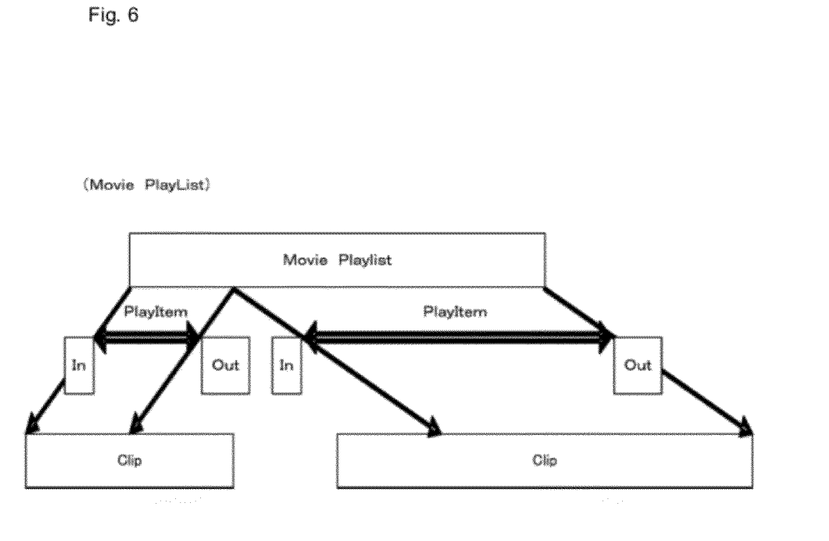
FIG. 6 illustrates a diagram illustrating structure of a Movie Playlist according to the embodiment.

As illustrated in FIG. 6, each of the HDMV mode title and the BD-J mode title is composed of one or more Movie Playlists, and each of the Movie Playlists further is composed of one or more Play Items. The Play Item includes information of a playing start position (In) and a playing end position (Out) of a certain clip, and thus, only parts desired to be played are connected arbitrarily from among a plurality of clips and can be played in the Movie Playlist. It is noted that a clip indicates a single video unit.

Accordingly, the menu detection unit 17 analyzes structure of the Movie Playlist currently being played and determines that a screen is in a menu state when the same playlist is, for example, repeated more than 20 times. In addition, when it is determined that a screen is in a menu state, the process proceeds to normal play. When it is determined that a screen is not in a menu state, the process proceeds to normal play after the process proceeds to the processing of Step 53 and steps after Step 53 the specific number of times.

Next, in a case where the main part detection unit 18 detects transition to a main part, the conditions are described below.

The main part detection unit 18 detects transition to a main part when disc management information meets any one of the following conditions (1) to (6). The disc management information is held in a PLAYLIST directory, etc. of FIG. 2 and includes information with which the following conditions (1) to (6) can be determined.

The Condition (1) in which a POP-UP MENU exists in a playlist.

The Condition (2) in which a play item has a duration of more than 15 minutes and UO mask does not exist.

The Condition (3) in which a play item has a duration of more than 15 minutes and a plurality of chapters exists.

The Condition (4) in which a play item has a duration of more than 15 minutes and a plurality of subtitles exists.

The Condition (5) in which a play item has a duration of more than 15 minutes and a plurality of types of sounds exists.

The Condition (6) in which a play item has a duration of more than 15 minutes and playing times between a playlist and the play item are the same or substantially the same.

In a case where a main part cannot be detected under the conditions (1) to (6), when the process proceeds to the processing of Step 53 and steps after Step 53 the specific number of times and main part cannot be detected in the predetermined number of processing, the process proceeds to normal play. It is noted that the 15 minutes of a play item in the condition (2) to (6) is an example. Attention is given that a title including a first play a time length of which is more than 15 minutes hardly exists. In this way, it becomes possible that the main part detection unit 18 detects transition to a main part by determining the main part using a time length of a play item with a very high probability.

Accordingly, in a vehicle environment where a driver is not allowed to operate a disc player device during the movement of the vehicle, it becomes possible that a playing time of a first play is reduced, and a process proceeds to a menu or playing of a main part. As a result, a time for performing transition to a menu or playing of a main part can be reduced. Especially, in a BD-J title for which it is practically difficult to perform a function of continued playing (resume playing), it is more effective to be used in a vehicle environment in which the power is turned on and off more often than in a household-use optical disc player device.

It is noted that when all user operations are prohibited, playing is performed at a normal speed because it is thought that a content provider expects users to watch and listen to software package with normal play at a normal speed.

In addition, a function to accept a user operation such as playing during execution of the flow diagram of FIG. 5 may be employed because a user may also want to watch commercial messages and movie previews. It is noted that it is possible such function can be set on and off in an initial setting.

Although a currently conceivable preferred embodiment of the present invention has been described above, it should be understood that various modifications can be made to the present embodiment and that all such modifications within the spirit and scope of the present invention are intended to be included in the appended claims.

INDUSTRIAL APPLICABILITY

As described above, the disc player device according to the present invention is useful as a disc player device to play data recorded in a recording medium such as a BD-ROM disc.

REFERENCE SIGNS LIST

10 BD-ROM
11 pickup
12 servo
13 local storage
14 network interface
15 signal processing unit
16 playing unit 17 menu detection unit
18 main part detection unit
19 user operation unit
100 disc player device
42 removable media
43 monitor
44 WWW server
56 remote control

The invention claimed is:

1. A disc player device which plays a disc managed on a basis of plurality of titles including at least a menu and a main part, the disc player device comprising:
 a signal processing unit which obtains data held in the disc and performs signal processing of the data;
 a menu detection unit which analyzes a structure of the data and detects a menu state;
 a main part detection unit which detects a playing state of a main part from the data; and
 a user operation unit which, automatically performs a user operation for playing a title currently being played faster than playing at normal speed until the menu state is detected by the menu detection unit or the playing state of the main part is detected by the main part detection unit when the signal processing unit determines a First Playback exists after a power is applied, wherein:
 the user operation automatically performed by the user operation unit is at least one of Menu Call, Chapter Search, Time Search, Skip to Next point, and Forward Play, and wherein
 the user operation unit repeatedly performs following steps 1 to 5 until a top menu or a main part is detected;
 (step 1) performing the Menu Call when the Menu Call is not restricted by UO mask in a movie title being played, and
  performing step 2 when the Menu Call is restricted by the UO mask,
 (step 2) performing the time Search to transit to a final time of a final chapter in the movie title being played when the Time Search is not restricted by UO mask in the movie title being played, and
  performing step 3 when the Time Search is restricted by the UO mask,
 (step 3) confirming whether or not a plurality of chapters exist in the movie title being played when the Chapter Search is not restricted by UO mask in the movie title being played, and performing the Chapter Search to transit to the final chapter in the title when the plurality of chapters exist, and after that performing step 4, and
  performing step 4 without performing the Chapter Search when the Chapter Search is restricted by the UO mask,
 (step 4) performing the Skip to Next point until transition to a final point in the title when the Skip to Next point is not restricted by UO mask in the movie title being played, and performing step 5, and
  performing step 5 without performing the Skip to Next point when the Skip to Next point is restricted by the UO mask,
 (step 5) performing a play at a feasible speed faster than the normal speed to a final time of a chapter being played when the Forward Play is not restricted by UO mask in the chapter.

2. The disc player device according to claim 1, wherein the main part detection unit determines whether or not a screen is in the playing state of the main part based on disc management information held in the disc.

3. The disc player device according to claim 2, wherein the main part detection unit detects transition to the main part when one of the following conditions (1) to (6) is met:
 (1) a POP-UP MENU exists in a playlist,
 (2) a play item has a duration of more than a specific time length and UO mask does not exist,
 (3) a play item has a duration of more than a specific time length and a plurality of chapters exists,
 (4) a play item has a duration of more than a specific time length and a plurality of subtitles exists,
 (5) a play item has a duration of more than a specific time length and a plurality of types of sounds exists, and
 (6) a play item has a duration of more than a specific time length and playing times between a playlist and the play item are substantially the same.

4. The disc player device according to claim 1, wherein the user operation unit automatically performs the user operation during a movement of a vehicle.

5. The disc player device according to claim 1, wherein the disc includes a BD-J title.

6. The disc player device according to claim 1, wherein each of the plurality of titles is composed of a plurality of playlists, and
 the menu detection unit determines that a screen is in the menu state when a playlist of a specific title is repeatedly played more than a specific number of times.

* * * * *